US010019308B1

(12) United States Patent
Gupta et al.

(10) Patent No.: US 10,019,308 B1
(45) Date of Patent: *Jul. 10, 2018

(54) DISASTER-PROOF EVENT DATA PROCESSING

(71) Applicant: Google LLC, Mountain View, CA (US)

(72) Inventors: Ashish Gupta, Sunnyvale, CA (US); Haifeng Jiang, Sunnyvale, CA (US); Manpreet Singh, Mountain View, CA (US); Monica Chawathe, Mountain View, CA (US)

(73) Assignee: Google LLC, Mountain View, CA (US)

( * ) Notice: Subject to any disclaimer, the term of this patent is extended or adjusted under 35 U.S.C. 154(b) by 259 days.

This patent is subject to a terminal disclaimer.

(21) Appl. No.: 14/860,441

(22) Filed: Sep. 21, 2015

Related U.S. Application Data

(63) Continuation of application No. 13/754,103, filed on Jan. 30, 2013, now Pat. No. 9,172,670.

(60) Provisional application No. 61/592,762, filed on Jan. 31, 2012.

(51) Int. Cl.
*G06F 11/07* (2006.01)

(52) U.S. Cl.
CPC ...... *G06F 11/0793* (2013.01); *G06F 11/0709* (2013.01); *G06F 11/0751* (2013.01)

(58) Field of Classification Search
None
See application file for complete search history.

(56) References Cited

U.S. PATENT DOCUMENTS

| 6,463,532 | B1 * | 10/2002 | Reuter | G06F 9/52 |
| | | | | 707/E17.007 |
| 7,376,867 | B1 * | 5/2008 | Aguilera | G06F 11/1482 |
| | | | | 714/21 |
| 9,172,670 | B1 * | 10/2015 | Gupta | H04L 51/02 |
| 2001/0025351 | A1 * | 9/2001 | Kursawe | G06F 11/182 |
| | | | | 714/4.1 |
| 2005/0149609 | A1 * | 7/2005 | Lamport | G06F 9/542 |
| | | | | 709/200 |
| 2005/0256824 | A1 * | 11/2005 | Vingralek | G06F 3/0617 |
| 2005/0283373 | A1 * | 12/2005 | Lamport | G06F 11/187 |
| | | | | 714/11 |
| 2005/0283659 | A1 * | 12/2005 | Lamport | G06F 11/182 |
| | | | | 714/11 |

(Continued)

*Primary Examiner* — Backhean Tiv
(74) *Attorney, Agent, or Firm* — Fish & Richardson P.C.

(57) ABSTRACT

Systems and methods are disclosed herein for providing fault tolerant processing of events. The system includes multiple consensus computers configured to communicate with one another and multiple event processors configured to process data such as events. Each consensus computer is further configured to receive a request to process a unit of data from an event processor. A consensus computer communicates with at least one other consensus computer to reach consensus as to whether the unit of data has previously been assigned to an event processor for processing. Then, a consensus computer sends a message to the event processor that sent the inquiry including instructions to either process the unit of data or not process the unit of data. Because the consensus computers determine whether a unit of data has previously been assigned to an event processor, the system ensures that an event is not processed more than once.

20 Claims, 6 Drawing Sheets

(56) References Cited

U.S. PATENT DOCUMENTS

| | | | |
|---|---|---|---|
| 2006/0069942 A1* | 3/2006 | Brasilerio | G06F 9/52 |
| | | | 714/4.1 |
| 2006/0136781 A1* | 6/2006 | Lamport | G06F 11/1482 |
| | | | 714/25 |
| 2006/0156312 A1 | 7/2006 | Supalov | |
| 2006/0168011 A1* | 7/2006 | Lamport | G06F 11/1494 |
| | | | 709/206 |
| 2007/0214355 A1* | 9/2007 | Lamport | G06F 11/182 |
| | | | 713/156 |
| 2009/0260012 A1* | 10/2009 | Borghetti | G06F 9/5061 |
| | | | 718/102 |
| 2010/0017495 A1* | 1/2010 | Lamport | H04L 63/123 |
| | | | 709/206 |
| 2010/0017644 A1* | 1/2010 | Butterworth | G06F 11/1658 |
| | | | 714/4.1 |
| 2010/0082728 A1* | 4/2010 | Cooper | G06F 11/2097 |
| | | | 709/202 |
| 2014/0189270 A1* | 7/2014 | Iwanicki | G06F 17/30159 |
| | | | 711/162 |

\* cited by examiner

DISASTER-PROOF EVENT DATA PROCESSING

CROSS REFERENCE TO RELATED APPLICATIONS

This application is a continuation of U.S. Provisional application Ser. No. 13/754,103, filed Jan. 30, 2013, now allowed, which claims priority to U.S. Provisional Application No. 61/592,762, filed on Jan. 31, 2012. Both the above-identified patent applications are hereby incorporated by reference in its entirety.

TECHNICAL FIELD

In general, the systems and methods disclosed herein describe reliable and fault tolerant processing of event data.

BACKGROUND

Hosts of websites sometimes sell or lease space on their websites to content providers. Often, it is useful for the hosts to provide content relevant to the content providers, such as data related to traffic on the website. In particular, the content providers often pay for space on a website based on the number of interactions (mouse clicks or mouseovers) users have with such websites. The data may be related to user clicks, queries, views, or any other type of user interaction with the website. Sometimes, systems that process this data fail or need to be temporarily disabled for maintenance, and data is lost. This can lead to inaccuracies in the reported statistics and can also lead content providers to underpay or overpay the website host. Thus, robust mechanisms are desired for providing reliable aggregate data in a useful form.

SUMMARY

Accordingly, systems and methods disclosed herein provide reliable, fault tolerant processing of online user events. According to one aspect, the disclosure relates to a system for processing event data. The system comprises multiple consensus computers configured to communicate with one another. Each consensus computer is further configured to receive an inquiry from an event processor. The inquiry includes a request to process a unit of data. A consensus computer communicates with at least one other consensus computer to reach consensus as to whether the consensus computers previously assigned the unit of data to be processed by an event processor. Based on the consensus reached, a consensus computer sends a message to the event processor that sent the inquiry including instructions to either process the unit of data or not process the unit of data.

According to another aspect, the disclosure relates to a method for providing reliable, fault tolerant processing of online user events. The method comprises receiving by a consensus computer an inquiry from an event processor. The inquiry includes a request to process a unit of data. The consensus computer communicates with at least one other consensus computer to reach consensus as to whether the consensus computers previously assigned the unit of data to be processed by an event processor. Based on the consensus reached, a consensus computer sends a message to the event processor that sent the inquiry including instructions to either process the unit of data or not process the unit of data.

BRIEF DESCRIPTION

The above and other features of the present disclosure, including its nature and its various advantages, will be more apparent upon consideration of the following detailed description, taken in conjunction with the accompanying drawings in which.

DETAILED DESCRIPTION

To provide an overall understanding of the disclosure, certain illustrative embodiments will now be described, including a system for processing data, in which metadata associated with what data has already been processed is stored in persistent data storage. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
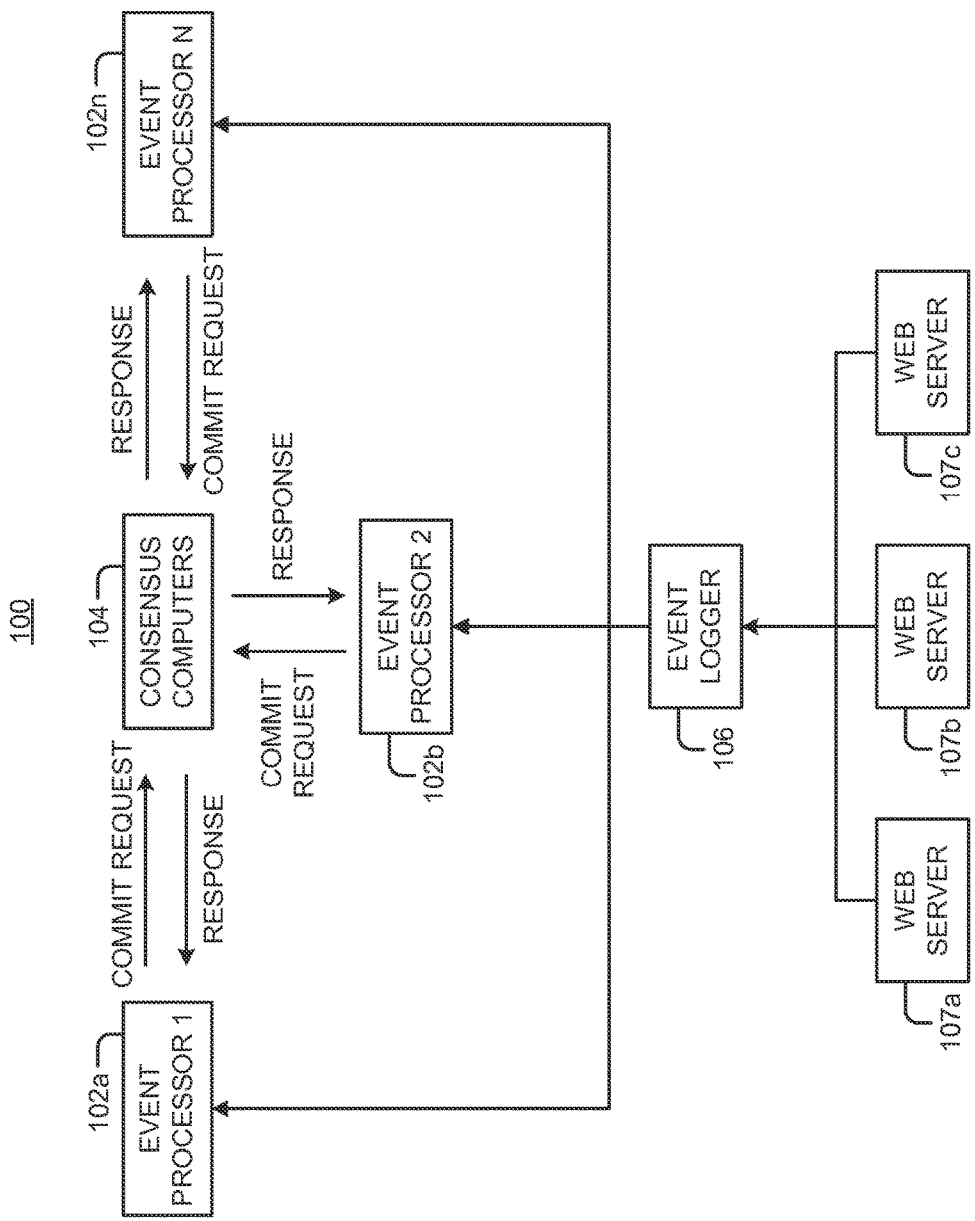
FIG. 1 shows a block diagram of a system that processes events, according to an illustrative embodiment of the disclosure.

FIG. 1 is a block diagram of a system 100 for processing data, according to an illustrative embodiment of the disclosure. System 100 includes three web servers 107a-107c (generally web servers 107), an event logger 106, event processors 102a-102n (generally event processors 102), and a set of multiple consensus computers 104. Generally, action events occur on the websites hosted by web servers 107, and event logger 106 records these events and sends the events to event processors 102 for processing. Each event processor 102 sends an inquiry to the set of consensus computers 104 for permission to commit to process a unit of data (an event). Then consensus computers 104 together decide whether to grant or deny the request and send a message including a reply to the event processor 102. Each of the components of system 100 is described further below.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information about the user is collected and used. Furthermore, data may not be tethered to the identity of individual users.

Web servers 107 are configured to host websites and receive data regarding user interactions with the websites. In particular, in the instance where a user consents to the use of such data, the data may include information such as user clicks, mouseovers, user queries, user views, or any other user interaction with a website. In addition to receiving data related to the type of user traffic that occurs on a website, web servers 107 may also determine, without limitation, the times at which these events occur, the applications the website runs, the user's geographic location, and the user's IP address. This data is of general interest to those who create and host websites and is especially useful for content providers. Knowledge of the data received by web servers 107 can help content providers to analyze user populations based on the history of their interactions with websites. Rather than paying large fees for a broad audience, the content providers may save money by using their analysis to serve an appropriate audience with relevant content. Thus, it is important for this data to be aggregated and processed into a useful form for website hosts and content providers.

In addition, it is undesirable to overestimate these numbers. Typically, content providers pay a fee to the website host for allowing the content provider to place content on the website. This fee may be a variable amount dependent on how many times users clicked on or otherwise interacted with the content. For example, the fee may be $0.01 per click, such that for 100 clicks, the content provider pays the website host $1. Thus, it is important to avoid overestimating the number of clicks such that the content provider is not overcharged, which would increase a risk of bad relations.

Event logger 106 is configured to record data related to an event. In the instance where a user consents to the use of such data, examples of events are action events, including user clicks, mouseovers, queries, views, or any other type of user interaction with a website. For example, if the event is a user click on some content, the data recorded by event logger 106 may include information indicative of the specific content, the user, the user's location, and the time the click occurred. In some embodiments, each event is uniquely identified by an event id, which is a triplet of data that contains the time the event occurred, the IP address of the web server serving the website, and the process identifier.

Event processors 102 are configured to receive units of data (such as events) from event logger 106, process data associated with each event, and possibly produce an output based on the event. Event processors 102 are typically server computers but generally could be any device capable of processing data. In some embodiments, event processors 102 operate independently of one another. Furthermore, each event processor 102 may receive the same events from event logger 106 and process the same events as other event processors. The consensus computers described further below interact with the event processors to prevent double counting of events. In this case, when there are many event processors, disconnection from system 100 of any one event processor for any reason has no significant effect on the overall operation of system 100.

In some embodiments, event processors 102 may require regular maintenance checks. During these times, event processors 102 need to be disconnected from system 100 without interrupting the overall operation of system 100. Because event processors 102 operate independently of one another and process the same events as one another, disconnection of a subset of event processors 102 would not affect the processing of other event processors 102, so long as such disconnections are staggered in time.

In some embodiments, event processors 102 are located in the same geographic location. In other embodiments, event processors 102 are located in separate geographic locations. Sometimes emergency situations such as power outages, natural disasters, or network failures that are localized to specific geographic locations may occur. When a localized emergency occurs that affects a subset of the event processors 102, the event processors in unaffected locations continue processing, allowing for un-interrupted operation of system 100.

In one embodiment, processing the data involves counting the total number of times a certain event occurs in a given time frame. For example, content providers who pay a company to run content on that company's website may be interested to know how many users interact with the content within a certain time interval. In this case, the processing by event processors 102 would include aggregating these statistics. Content providers can use this sort of information to serve their audiences by selectively displaying relevant content that may be of most interest to a user. When the company provides these statistics to content providers, it is less desirable to overestimate these numbers than to underestimate them. Overestimated statistics may suggest that the company purposely inflated the numbers to generate more business from the content providers, reflecting poorly on the company. In addition, the fee that the content providers pay the company may depend on these statistics. For example, the fee may be a fixed amount for each click, and the company may mistakenly overcharge the content providers by providing overestimates. Therefore, it is important to avoid double counting a single event. When multiple event processors are independently processing the same events, a mechanism is required to ensure this does not occur. In some embodiments, consensus computers 104 provide this mechanism.

Consensus computers 104 are configured to agree on whether an event has already been processed by storing metadata regarding which events have been processed. Each consensus computer 104 stores, maintains, and updates this metadata in a database. In some embodiments, the metadata is stored in each consensus computer 104 based on the event ids, each event id corresponding to a unique identifier of an event. In some embodiments, a consensus computer 104 is configured to vote on whether an event has already been processed. The votes are based on the metadata stored in each consensus computer 104. If the individual event processors 102 stored the metadata, system 100 would risk losing the metadata if an event processor 102 fails or is disconnected from the system. Thus, it is desirable to store and update the metadata in a central location such as in consensus computers 104.

Consensus computers 104 are typically a set of multiple (for example, 5) server computers but could be any set of devices that can store metadata, communicate with event processors 102, and communicate with one another to reach consensus. When an event processor 102 receives an event to process from event logger 106, the event processor 102 sends an inquiry to the consensus computers 104 to request for permission to commit to process the event. As will be described in more detail later, in some embodiments, this request to commit to process the event may be sent by an event processor 102 before the processing occurs. In other embodiments, the request to commit to process the event may occur after some processing has occurred but has not yet been completed. In either scenario, the event processor 102 sends a request for permission to commit to process the event before finalization of the processing occurs.

Upon receiving a request from an event processor 102 to commit to process an event, consensus computers 104 check their metadata databases to determine whether an event processor 102 has previously been committed to process the event. If the consensus computers 104 determine that an event processor 102 has already committed to process the event, a message denying the request is sent to the event processor 102, which discards the event. Otherwise, the consensus computers 104 send a message to the event processor 102 approving the request, and the metadata databases are updated to reflect that an event processor 102 has committed to process the event. By ensuring that two event processors 102 are not committed to process the same event, consensus computers 104 avoids overestimation of statistics by prohibiting double processing of any data.

In some embodiments, consensus computers 104 use known methods for reaching consensus known as consensus algorithms, such as the Paxos algorithm. Some consensus algorithms, such as the Paxos algorithm, are fault tolerant, i.e., they are robust to the failure of a participant (in this case, a consensus computer 104). This means that the overall operation of system 100 is not interrupted when one of the consensus computers 104 fails, is disconnected for maintenance, or is otherwise unable to participate in the consensus algorithm. Consensus algorithms can typically continue to operate as long as more than half the consensus computers 104 are participating. For example, a group of five consensus computers 104 can still reach consensus if one or two consensus computers 104 do not participate.

In some embodiments, consensus computers 104 are located in the same geographic location. In other embodiments, consensus computers 104 are located in separate geographic locations. Having consensus computers 104 located separately in different geographic locations allows system 100 to continue operation when one or more (but less than half) of the consensus computers 104 fail due to geographically localized incidents that impact consensus computer uptime.

The logic corresponding to methods described herein can be implemented in hardware, software, firmware, or a combination thereof. When the logic is implemented in software, the logic can be stored in a computer readable medium, and the program instructions can be executed by one or more processors incorporated into the various computing devices described above.

Figure 2:
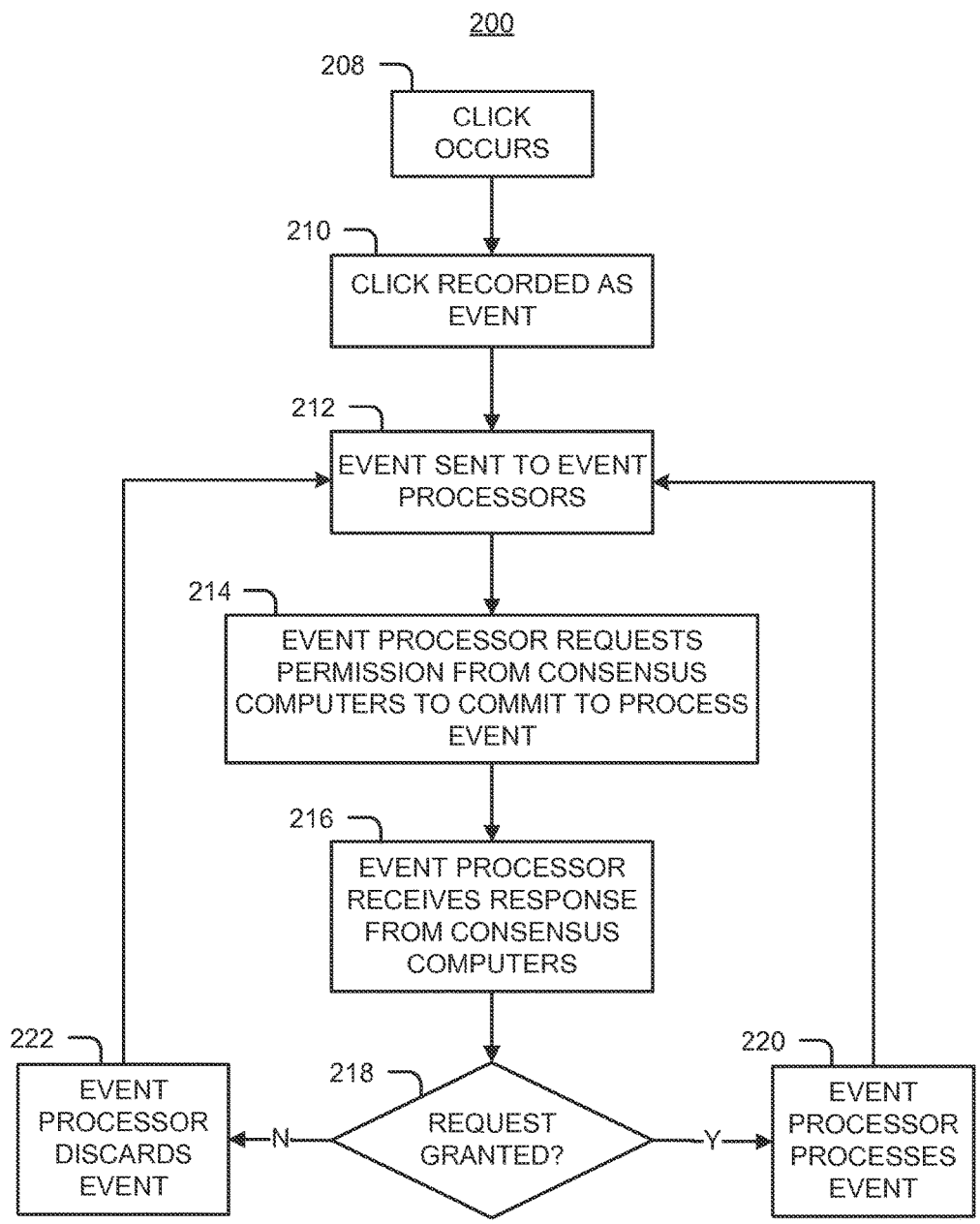
FIG. 2 shows a flowchart of a method used by an event processor to process an event, according to an illustrative embodiment of the disclosure.

FIG. 2 shows a flowchart of a method 200 for processing events (such as clicks) from the perspective of an event processor 102, according to an illustrative embodiment of the disclosure. The method includes the steps of a click occurring (step 208) and being recorded as an event (step 210). The event is then sent to an event processor (step 212), which requests permission to commit to process the event (step 214). The event processor then receives a response (step 216) regarding whether its request was granted (decision 218). Depending on the response, the event is either discarded (step 222) or is processed (step 220). In method 200, the request to commit to process the event is sent to the consensus computers before any processing occurs.

First, an event occurs, such as a user click on content in a web page application (step 208), and is recorded as an event (step 210) by the event logger 106. The event logger 106 records these action events by storing them as events and sends these events to the event processors 102 for processing (step 212). Alternatively, the event processors 102 may proactively retrieve events from the event logger 106. In some embodiments, all event processors 102 receive the same set of events. This minimizes the probability that an event would not get processed due to the failure of an event processor. The event logger 106 may send the same event to all event processors 102 at the same time, or the event logger 106 may stagger the times an event is sent to different event processors 102.

After an event processor 102 receives an event from the event logger 106 for processing (step 212), the event processor 102 sends an inquiry to the set of consensus computers 104 (step 214). The inquiry includes a request for permission to commit to process the event. When each event is uniquely identified by an event id, the inquiry includes the event id as a label for the event. In some embodiments, the event processor 102 sends the inquiry to just one consensus computer 104, which forwards the request to all four other consensus computers 104 (when there are five total consensus computers). In other embodiments, the event processor 102 may send the inquiry to multiple consensus computers 104 simultaneously.

After receiving a response from the consensus computers 104 (step 216), the event processor 102 determines whether its request for permission to commit to process the event has been granted (decision 218). If the event processor 102 determines that its request was not granted by the consensus computers 104, the event processor 102 discards the event (step 222) and considers the next event in its queue or waits to receive another event from the event logger 106 (step 212). Alternatively, if the request was granted by the consensus computers 104, the event processor 102 processes the event (step 220) before returning to step 212 to consider the next event in its queue or to wait to receive another event from the event logger 106. In some embodiments, events are user clicks, and the processing performed by the event processors involves incrementing values in counters that keep a record of how many user clicks of a certain type have occurred.

In some embodiments, many events occur within a short time interval, such that more events are sent to an event processor 102 (step 212) before the event processor 102 has completed processing a previous event. For example, an event processor 102 may receive a new event before receiving a response from the consensus computers 104 (216) regarding a previous event. In this case, event processor 102 can send another inquiry to the set of consensus computers 104 regarding the new event before receiving a response regarding a previous inquiry. This idea can be extended to multiple events, such that an event processor 102 may have a pipeline of events. At any given time, processing of different events in the pipeline may be in different stages of method 200.

Figure 3:
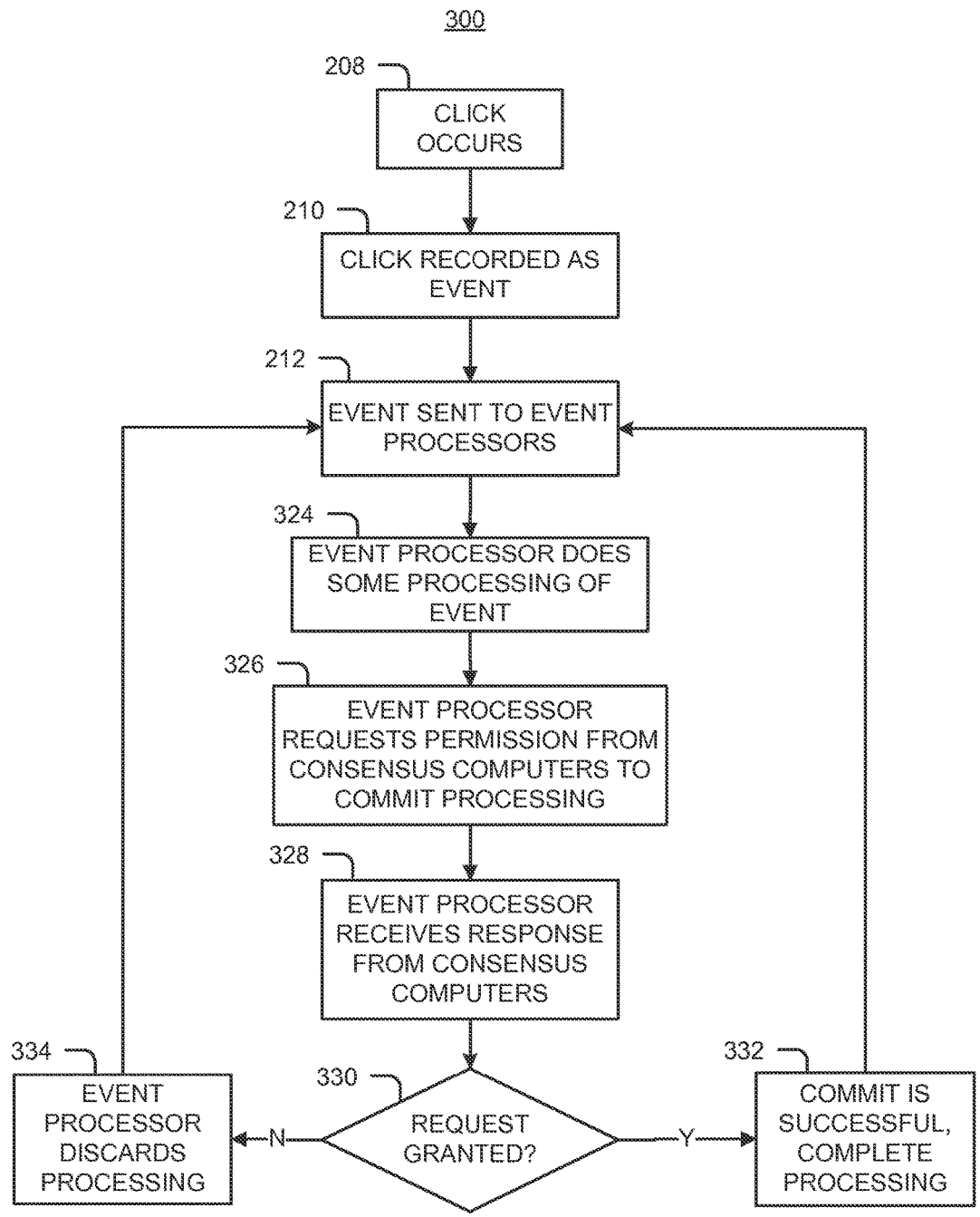
FIG. 3 shows a flowchart of a method used by an event processor to process an event, according to an illustrative embodiment of the disclosure.

FIG. 3 shows a flowchart of a method 300 for processing events from the perspective of an event processor 102, according to an illustrative embodiment of the disclosure. The method 300 is similar to method 200, with some key differences. Steps 208, 210, and 212 in method 300 are identical to those in method 200. These steps involve the occurrence of a click (step 208), the recordation of the click as an event (step 210), and the event being sent to event processors 102 (step 212). Once an event processor 102 receives an event, it performs some of the processing of the event (step 324) before requesting permission to commit its processing (step 326). Then depending on the received response (step 328 and decision 330), the event processor either discards its work (step 334) or successfully commits and completes its processing (step 332). In method 300, the request to commit the processing occurs after some processing has been done but has not yet been completed.

In method 300, the event processor 102 first accomplishes some processing of the event before requesting permission from the consensus computers 104 to commit its processing. This is in contrast to method 200, in which the event processor first requests permission from the consensus computers to process the data before processing the data. In the case when the processing involves incrementing values in counters, according to method 300, the initial stage of processing the event means that the event processor 102 does all the work necessary to prepare incrementing the counter prior to requesting permission from the consensus computers 104. For example, necessary work in preparation for incrementing a counter may include classifying an event into one or more categories based on data related to the user who initiated the action, the type of action involved, or the time the action occurred. The request for permission to commit its processing is then a request to actually increment the counter.

Depending on the nature of the events and the processing to be done, it may be preferable to use method 200 over method 300, or vice versa. For example, method 200 may be preferable if a system is confident that the event processors 102 will follow through with processing the data. In method 200, the event processor 102 processes an event after the last interaction with the consensus computers 104 regarding the event. In this case, an event processor 102 might receive permission to process an event, but then fail or become otherwise disconnected before the processing is done. Because the consensus computers 104 never receive confirmation that processing has occurred, it is possible that a system using method 200 will fail to process some events. When processing involves incrementing counters, this means that a system using method 200 may underestimate overall counts, but is unlikely to overestimate counts.

Alternatively, method 300 may be preferable over method 200. For example, if the likelihood of failure in an event processor 102 is high, it would be preferable for some processing to be done before the request is sent to the consensus computers 104. In this case, consensus computers 104 essentially receive confirmation that the processing has been nearly completed, and there is less uncertainty regarding whether processing will take place compared to method 200. In other words, when event processors are likely to fail or become otherwise disconnected, a system using method 300 can maintain more accurate counts than a system using method 200.

However, a system using method 300 has a risk of redundant processing across different event processors. For example, multiple event processors 102 can process the same event (step 324), but only one will be able to successfully commit its processing (step 332). The other redundant event processors 102 discard their work (step 334). Therefore, method 200 may be preferred when there are a large number of events that require processing and redundant processing would lead to an intolerable amount of inefficiency. In contrast, when there are a small number of events such that some redundancy is tolerable and it is preferred to maintain more accurate counts, method 300 may be preferred over method 200.

In some embodiments, the system is configured to automatically transition between methods 200 and 300 depending on the current event flow.

In some embodiments, the system combines methods 200 and 300. In this case, event processor 102 first requests permission from consensus computers 104 to commit to process an event (step 214). Upon receiving permission, the event processor 102 performs some processing of the event and sends another message to the consensus computers 104 to confirm that some processing has occurred and to request permission to complete the final stages of processing (step 326). In this case, the consensus computers 104 may still give permission to a second event processor to process an event that has already been assigned to a first event processor if the confirmation message from the first event processor has not yet arrived. For example, the consensus computers 104 may set an expiration time limit for how long to wait after granting permission to one event processor to process an event before granting the same permission to another event processor. While this system ensures that the consensus computers 104 contain accurate information, the number of interactions between the event processors 102 and the consensus computers 104 has effectively doubled, which is likely to significantly slow down the overall system.

Figure 4:
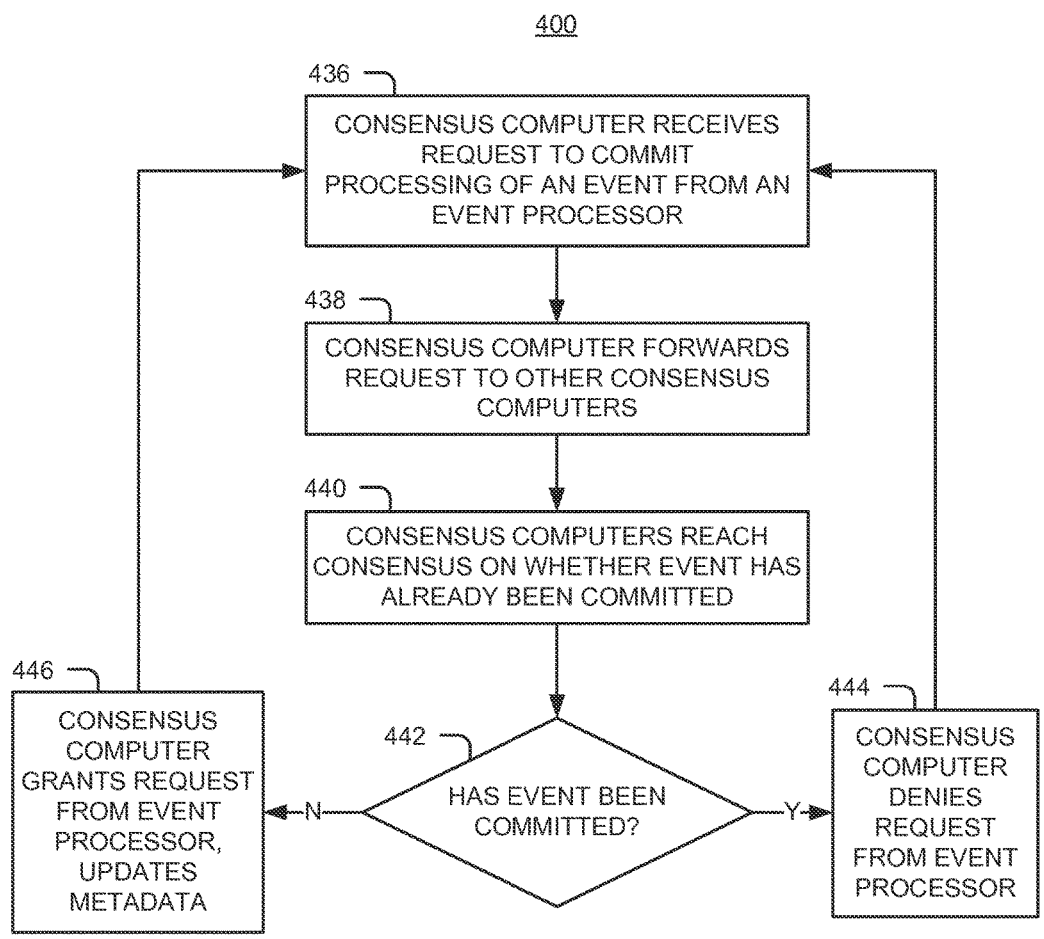
FIG. 4 shows a flowchart of a method used by a set of consensus computers to reach consensus regarding whether an event processor has already been committed to process an event, according to an illustrative embodiment of the disclosure.

FIG. 4 shows a flowchart of a method 400 for processing data from the perspective of a consensus computer 104, according to an illustrative embodiment of the disclosure. The method 400 describes the steps taken by the consensus computers 104 to reach agreement on whether an event processor 102 has already committed to process or has already processed an event, and is applicable to either method 200 or method 300. The method 400 includes the steps of a consensus computer 104 receiving a request from an event processor 102 to commit processing for an event (step 436), the consensus computer 104 forwarding the request to other consensus computers (step 438), and all the consensus computers 104 agreeing on whether the processing of the event has already been committed by an event processor 102 (step 440 and decision 442). If the consensus computers 104 reach consensus that the event has already been committed, a consensus computer 104 grants the request and updates the database of metadata to reflect that an event processor 102 has committed to process the event (step 446). Otherwise, the request is denied (step 444).

First, a consensus computer 104 receives a request from an event processor 102 to commit its processing of an event (step 436). This step is identical to step 214 from method 200 and step 326 from method 300, but from the perspective of the consensus computer 104. In method 200, the request involves permission to process the event in the future, while in method 300, the request involves permission to commit the processing of an event for which some processing has already been done. The consensus computer 104 then forwards the request to all other consensus computers 104 (step 438). When all consensus computers 104 have received the request, they reach consensus on whether an event processor 102 has already committed to processing the event (step 440).

In some embodiments, consensus is reached by well known consensus algorithms such as the Paxos algorithm. In this case, the consensus computer 104 that initially receives the request from the event processor 102 is called the "proposer." The proposer sends the request to at least one other consensus computer 104 (called the "acceptor"). The acceptors then vote on whether an event processor 102 has already been committed to process the event, and the number of votes indicating that the event has not already been committed is counted. If the number of votes exceeds a threshold, consensus computers 104 have reached consensus that the event has not yet been committed. Otherwise, consensus has been reached that the event has already been committed.

Obtaining consensus through multiple consensus computers is useful, because like the event processors, the consensus computers also need, from time to time, to be taken off-line for maintenance. Thus there is a benefit to having multiple computers available to respond to commit requests. If there are multiple consensus computers, due to varying network latencies and the possibilities of dropped or delayed packets, or other network errors, not all consensus computers will necessarily respond to each commit request. As a result, their individual databases of processed events may come out of synchronization. To account for such differences, the computers collaborate to reach consensus with respect to each request, providing a fault tolerant system for evaluating event processor requests.

Once consensus has been reached (decision 442), a consensus computer 104 sends a message to the event processor 102 that sent the original request. In some embodiments, the consensus computer 104 that sends the reply to the event processor is the same as the consensus computer 104 that received the initial request (for example, the proposer in the Paxos algorithm). In other embodiments, two different consensus computers 104 may receive the request and send the reply.

If the consensus computers 104 agreed that an event processor 102 has already committed to processing the event, the message includes a denial of the request (step 444). Otherwise, the message includes a grant of the request, and the database of metadata is updated to reflect that an event processor 102 has committed to process the event (step 446). After the message has been sent from the consensus computers 104 to the event processor 102, consensus computers 104 wait for the next request (step 436). In some embodiments, event processors 102 always send requests to a single consensus computer 104, which forwards the requests to the other consensus computers 104. In the case when the Paxos algorithm is used to reach consensus, this means that the same consensus computer 104 is always the proposer for every event. In other embodiments, multiple consensus computers 104 are configured to receive requests from event processors, meaning that different consensus computers 104 are proposers for different events.

In some embodiments, one or more consensus computers 104 may receive a new request before consensus has been reached regarding a previous request. In this case, consensus computers 104 can begin the process of reaching consensus (e.g., voting) regarding the new request before the response for the previous request has been sent. This idea can be extended to multiple events, such that consensus computers 104 have a pipeline of events to consider. At any given time, the method of reaching consensus for different events in the pipeline may be in different stages of method 400.

When there are many events that require processing, it would be useful to lower the number of interactions between the event processors 102 and the consensus computers 104. One way to accomplish this is to create bundles of multiple events such that event processors 102 can request to commit to process all the events in a bundle. In some embodiments, event processors 102 create the bundles themselves. In this case, there is potential for overlap between two bundles created by two different event processors 102 because the event processors 102 operate essentially independently. In addition, there is a risk of losing a bundle due to failure of an event processor 102.

Figure 5:
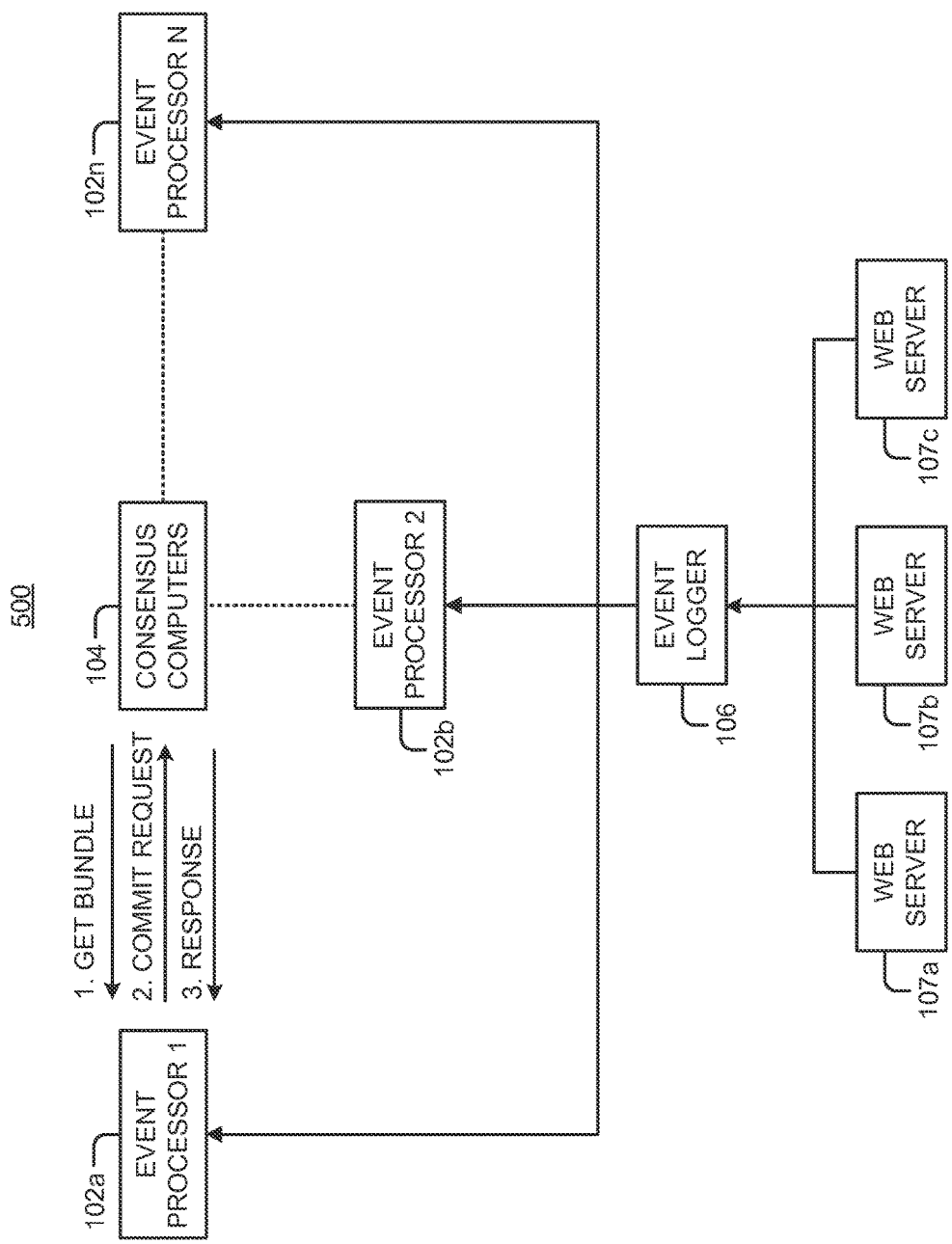
FIG. 5 shows a block diagram of a system that processes bundles of multiple events, according to an illustrative embodiment of the disclosure.

FIG. 5 is a block diagram of a system 500 for processing data, according to an illustrative embodiment of the disclosure. The elements of system 500 (event processors 102, consensus computers 104, web servers 107, and event logger 106) are identical to the elements of system 100 as shown in FIG. 1. However, in system 100, the units of data to be processed are single events, while in system 500, the units of data to be processed are bundles of multiple events.

In system 500, the bundles are created and stored in the consensus computers 104. An event processor 102 can commit to process not only one event at a time, but a bundle of multiple events. The processing is still done on at the event level, meaning each event in the bundle still gets processed individually, but the event processor 102 is committed to process all the events in a bundle.

First, an event processor 102 retrieves a bundle of multiple events from the consensus computers 104. Then, as described in relation to FIG. 2, the event processor 102 sends an inquiry to the consensus computers 104 requesting to commit to process all the events in the bundle and waits for a response. Alternatively, as described in relation to FIG. 3, the event processor 102 may first accomplish some of the processing of each event in the bundle before sending an inquiry to the consensus computers 104 requesting to commit to finalize the processing for all the events in the bundle. In either scenario, performance in system 500 is improved from system 100 in that event processor 102 only needs to query the consensus computers 104 once regarding a bundle of multiple events, rather than sending multiple inquiries (one inquiry for each event) to the consensus computers 104. Once the consensus computers 104 reach consensus on each event in the bundle, the event processor 102 receives the proper response for each event in the bundle.

Figure 6:
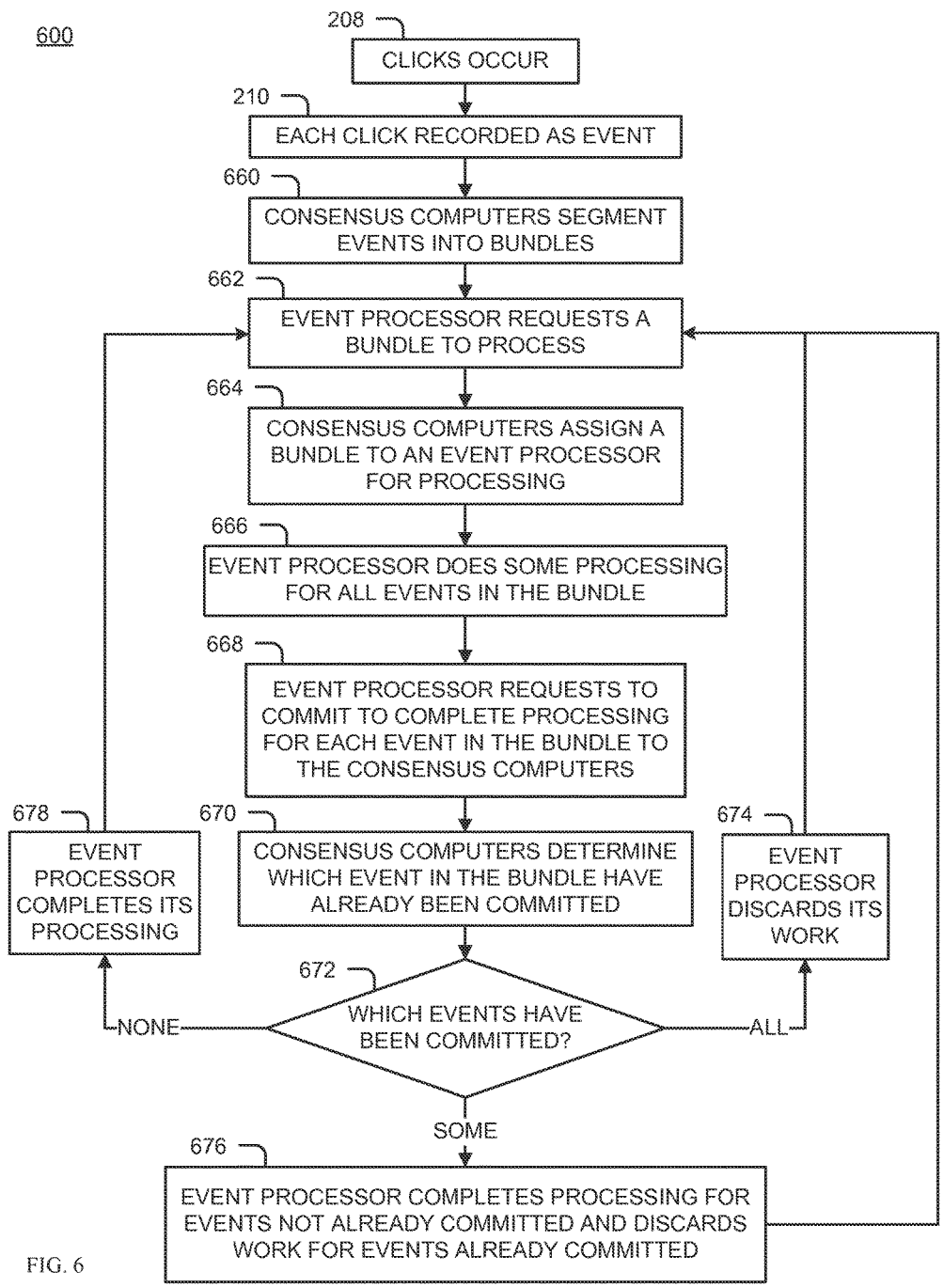
FIG. 6 shows a flowchart of a method used by a set of event processors and a set of consensus computers for processing bundles of multiple events, according to an illustrative embodiment of the disclosure.

FIG. 6 shows a flowchart of a method 600 for processing data when multiple events are stored in bundles, according to an illustrative embodiment of the disclosure. The method 600 includes the steps of clicks occurring (step 208) and being stored as events (210). Consensus computers 104 segment the set of events into bundles (step 660), and an event processor requests a bundle to process (step 662) and receives and does some processing of the bundle (steps 664 and 666). Then the event processor 102 requests to commit the processing of each event in the bundle (step 668), and the consensus computers 104 reach consensus as to whether each event in the bundle has already been committed (step 670). Based on the results from the consensus computers 104 (decision 672), the event processor either discards all of its work (step 674), commits processing for a subset of bundle (step 676), or commits the whole bundle (step 678).

First, clicks occur (step 208), and the event logger 106 records each click as an event (step 210). Then event logger 106 either directly or indirectly sends information to the consensus computers 104 indicative of the events. In some embodiments, the event logger 106 sends the actual events to consensus computers 104. In other embodiments, the event logger 106 may send the address locations that store the events.

Consensus computers 104 then segment the set of events into smaller subsets of events, creating bundles (step 660). In order to perform this segmentation, consensus computers 104 use a consensus algorithm to reach agreement regarding which events are contained in each bundle. In the embodiments shown in FIGS. 5-6, by creating and storing the bundles globally in the consensus computers 104, no overlap between bundles is allowed to increase efficiency. In addition, storage of the bundles is fault-tolerant in the event of failure of one or more event processors 102 or one or more consensus computers 104.

In some embodiments, overlap between two or more bundles may be desirable as a back-up system to ensure processing of each event occurs. For example, the processing of a number of events may be critical such that it is intolerable to allow one to go unprocessed. In this case, consensus computers 104 can create bundles with the desired amount of redundancy.

In some embodiments, the size of the bundles may depend on the complexity expected from the required processing. For example, it may be preferable to have large bundles if processing is expected to be relatively simple. On the other hand, smaller bundles may be preferable for more complex processing.

After bundles have been created, an event processor 102 sends an inquiry to the consensus computers 104 (step 662). The inquiry includes a request for a bundle to process (step 662). In some embodiments, the event processor 102 sends the inquiry to just one consensus computer 104, which then forwards the request to all other consensus computers 104. In other embodiments, the event processor 102 may send the inquiry to more than one consensus computer 104. Consensus computers 104 then reach consensus regarding which bundle to assign to the event processor 102 that made the request. Such agreement may be met using known consensus algorithms such as Paxos as described earlier.

Then, a consensus computer 104 sends a message to the event processor 102 with information indicative of which bundle of events to process (step 664). In some embodiments, the message includes the bundle itself, or the message includes an address pointing to where the bundle is stored. For example, when events in a bundle are stored in adjacent address locations, the message may include pointers indicating the beginning (onset) and end (offset) of address locations of the events in a bundle. As described in relation to FIG. 4, in some embodiments, the same consensus computer 104 that received the initial request sends the reply. In other embodiments, two different consensus computers 104 may receive the request and send the reply.

In some embodiments, the consensus computers 104 can mark a bundle as "owned" if the bundle has been assigned to an event processor 102 for processing but has not yet been finalized. This is similar to the concept of expiration of a granted permission as described in relation to the combination of methods 200 and 300 as described in FIG. 3. In this case, in order to reduce redundant processing, consensus computers 104 would not assign a bundle that is owned by one event processor to another event processor. Reduced redundancy is beneficial for bundle-level processing, where significant productivity could be lost if multiple event processors 102 were processing the same bundle. In this case, for an event processor 102, getting permission to process the events in a bundle (e.g., ownership of a bundle) before doing the processing is cheaper than processing the events first before attempting to commit. However, with event-level processing as illustrated in FIGS. 1-4, multiple event processors 102 processing the same event usually does not lead to a significant loss in productivity. This is because the cost of getting permission to process an event is not substantially smaller than the cost of processing the event and committing afterwards with the possibility of denial.

Once an event processor 102 receives a bundle of events from consensus computers 104, the event processor 102 performs some processing of all the events in the bundle (step 666). In the case when events correspond to user clicks and counters need to be incremented, this may involve doing the work necessary to prepare for incrementing the counters, as described in relation to FIG. 3.

Then the event processor 102 sends a request to the consensus computers 104 for permission to commit to complete the processing for each event in the bundle (step 668). In the case when events correspond to user clicks and counters need to be incremented, the event processor 102 requests permission to increment the counters in step 668.

In some embodiments, event processors 102 generate output results after having performed some processing. For example, an event processor 102 may create an output file that records the results of the processing. It is possible that loss of the output file due to the failure of an event processor 102 is intolerable. In this case, the event processor 102 can send the output results to the consensus computers in the same transaction when requesting to commit to complete processing for the bundle in step 668. For example, the event processor 102 may create a message including the name of an output file or an address indicating where the output file is located and send this message with the request to commit the bundle.

After receiving the request to commit the processing of the bundle from an event processor 102, consensus computers 104 reach consensus on whether each event in the bundle has already been committed by an event processor 102 (step 670). In some embodiments, the consensus computers 104 globally store information indicative of which events in which bundles have already been committed for processing in a database of metadata.

In some embodiments, the consensus computers 104 consider each event in the current bundle to check if any are listed in the database. The consensus computers 104 then generate a message including information indicative of whether each event has already been committed, and send the message to the event processor 102 that sent the request. Thus, even though the number of interactions between the event processors 102 and the consensus computers 104 has decreased, thereby improving performance, consensus computers 104 are still required to reach consensus for each event in a bundle.

In other embodiments, consensus computers 104 may grant only approval of the whole bundle or none of the bundle at all. In this case, consensus computers 104 have created bundles such that no overlap is allowed (no event belongs to more than one bundle). Therefore, when considering a request by an event processor to check whether the events in a bundle have already been committed, consensus computers 104 only need to check a single event to determine whether all the events in the bundle have been committed. This embodiment could be very efficient because not only has the number of interactions between the event processors 102 and the consensus computers 104 been reduced, but also the number of times the consensus computers 104 need to reach consensus has decreased.

In some embodiments, the consensus computers 104 also store address locations corresponding to which events have been processed. In addition to determining which events in a bundle have already been committed (step 670), consensus computers 104 may also update these address locations. For example, events may be stored in segments of adjacent events, and the beginning (onset) to the end (offset) of a segment may indicate the address locations of processed events. Updating these address locations may involve merging neighboring segments or creating new segments. Furthermore, consensus computers 104 may delete a bundle (or delete its address location) once processing of the bundle is complete and the address locations of processed events have been updated.

Depending on the response from the consensus computers 104 (decision 672), the event processor 102 takes one of three actions before requesting another bundle to process (step 662). First, if each event in the bundle has already been committed, the event processor 102 discards all of the work associated with the bundle (step 674). Second, if none of the events in the bundle have been committed, the event processor 102 completes the processing of the whole bundle (step 678). In some embodiments, this involves incrementing values in counters and/or generating an output file. Third, if some of the events have been committed and some have not yet been committed, the event processor 102 completes the processing for those events that have not yet been committed and discards the rest of its work associated with the bundle (step 676). When no bundles overlap, step 676 is not performed, and an event processor will either discard all of its work associated with the bundle (step 674) or complete processing of the whole bundle (step 678).

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

The invention claimed is:

1. A method of providing fault tolerant event processing, comprising:
receiving, by a particular consensus computer from among a plurality of consensus computers in communication with one another, a request to process a unit of data from a particular event processor from among a plurality of event processors, wherein each of the plurality of consensus computers stores metadata in its own metadata database regarding which units of data have been processed by that consensus computer;
forwarding, by the particular consensus computer, the request to process the unit of data from the particular event processor to the plurality of consensus computers;
determining, by the plurality of consensus computers, whether the unit of data is to be processed by the particular event processor based on a determination of a consensus of whether any event processor of the plurality of event processors has already committed to processing the unit of data based on the metadata stored in each of the plurality of consensus computer's respective metadata database; and
instructing, by the particular consensus computer, the particular event processor on how to process the unit of data in accordance with the consensus.

2. The method of claim 1, wherein the consensus is determined based on applying a Paxos consensus algorithm to one or more votes received from the plurality of consensus computers.

3. The method of claim 1, wherein the unit of data includes bundles of one or more action events.

4. The method of claim 3, further comprising: storing information indicative of the one or more action events on a consensus system.

5. The method of claim 1, wherein each consensus computer is configured to:
vote on whether a plurality of consensus computers previously assigned each action event included in a bundle to be processed by an event processor; and
instruct the event processor that sent the request to process the unit of data to process a portion of the bundle or not process the bundle based on the consensus.

6. The method of claim 1, wherein each consensus computer is configured to:
count votes from at least one other consensus computer of the plurality of consensus computers; and
determine whether the number of votes indicating that the plurality of consensus computers have previously assigned the unit of data to be processed by an event processor exceeds a threshold, wherein the instructions are based on the determination.

7. The method of claim 1, wherein the plurality of consensus computers determines the consensus using a fault tolerant consensus algorithm that tolerates the failure of a consensus computer of the plurality of consensus computers or the failure of an event processor.

8. The method of claim 1, wherein the plurality of consensus computers are configured to:
determine whether any event processor of the plurality of event processors is currently processing the unit of data; and
responsive to determining that an event processor of the plurality of event processors is currently processing the unit of data, instructing the particular event processor not to process the unit of data.

9. The method of claim 8, wherein the particular event processor and the particular consensus computer are located at separate geographic locations.

10. The method of claim 1, further comprising:
based on a determination the particular event processor is approved to process the unit of data by the plurality of consensus computers, updating, by the particular consensus computer, the particular consensus computer's metadata database to reflect that the event processor has to committed to process the unit of data.

11. A consensus system comprising:
a plurality of consensus computers in communication with each other, each consensus computer comprising storage units storing instructions that when executed by a particular consensus computer of the plurality of consensus computers cause the particular consensus computer to perform operations comprising:
receiving a request to process a unit of data from a particular event processor of a plurality of event processors, wherein each of the plurality of consensus computers stores metadata in its own metadata database regarding which units of data have been processed by that consensus computer;
forwarding, the request to process the unit of data from the particular event processor to the plurality of consensus computers;
determining whether the unit of data is to be processed by the particular event processor based on a determination from the plurality of consensus computers of a consensus of whether any event processor of the plurality of event processors has committed to processing the unit of data based on the metadata stored in each of the plurality of consensus computer's respective metadata database; and instructing the particular event processor on how to process the unit of data in accordance with the consensus.

12. The system of claim 11, wherein the consensus is determined based on applying a Paxos consensus algorithm to one or more votes received from the plurality of consensus computers.

13. The system of claim 11, wherein the unit of data includes bundles of one or more action events.

14. The system of claim 13, the operations further comprising: storing information indicative of the one or more action events.

15. The system of claim 11, wherein each consensus computer in the plurality of consensus computers is configured to:

vote on whether one or more consensus computers previously assigned each action event included in a bundle to be processed by an event processor; and instruct the particular event processor that sent the request to process the unit of data to process a portion of the bundle or not process the bundle based on the consensus.

16. The system of claim 11, wherein each consensus computer in the plurality of consensus computers is configured to:

count votes from at least one other consensus computer in the plurality of consensus computers; and determine whether the number of votes indicating that one or more consensus computers have previously assigned the unit of data to be processed by an event processor exceeds a threshold, wherein the instructions are based on the determination.

17. The system of claim 11, wherein the plurality of consensus computers determines the consensus using a fault tolerant consensus algorithm that tolerates the failure of a consensus computer of the plurality of consensus computers or the failure of an event processor.

18. The system of claim 11, wherein each consensus computer in the plurality of consensus computers is configured to:

determine whether any event processor of a plurality of event processors is currently processing the unit of data; and responsive to determining that an event processor of the plurality of event processors is currently processing the unit of data, instructing the particular event processor not to process the unit of data.

19. The system of claim 18, wherein the particular event processor and the particular consensus computer are located at separate geographic locations.

20. The system of claim 11, the operations further comprising: based on a determination the event processor is approved to process the unit of data by the plurality of consensus computers, updating the particular consensus computer's metadata database to reflect that the event processor has to committed to process the unit of data.

* * * * *

UNITED STATES PATENT AND TRADEMARK OFFICE
CERTIFICATE OF CORRECTION

| | | |
|---|---|---|
| PATENT NO. | : 10,019,308 B1 | Page 1 of 1 |
| APPLICATION NO. | : 14/860441 | |
| DATED | : July 10, 2018 | |
| INVENTOR(S) | : Gupta et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 320 days.

Signed and Sealed this
Sixteenth Day of April, 2019

Andrei Iancu
*Director of the United States Patent and Trademark Office*